Nov. 1, 1932.    J. W. SMITH    1,885,559
FUEL MIXING DEVICE FOR INTERNAL COMBUSTION ENGINES
Filed May 16, 1929    2 Sheets-Sheet 1
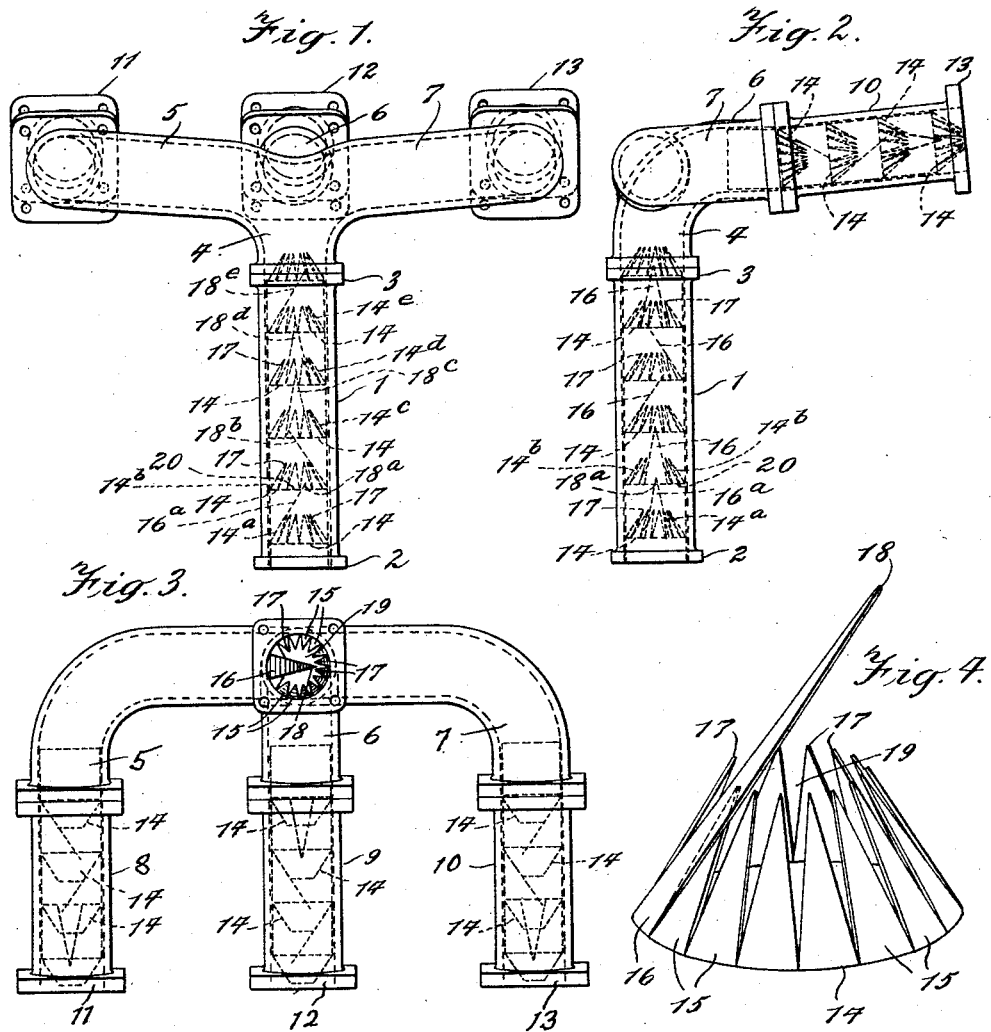
INVENTOR
John William Smith
BY Gustav Drews
ATTORNEY Nov. 1, 1932.  J. W. SMITH  1,885,559
FUEL MIXING DEVICE FOR INTERNAL COMBUSTION ENGINES
Filed May 16, 1929  2 Sheets-Sheet 2
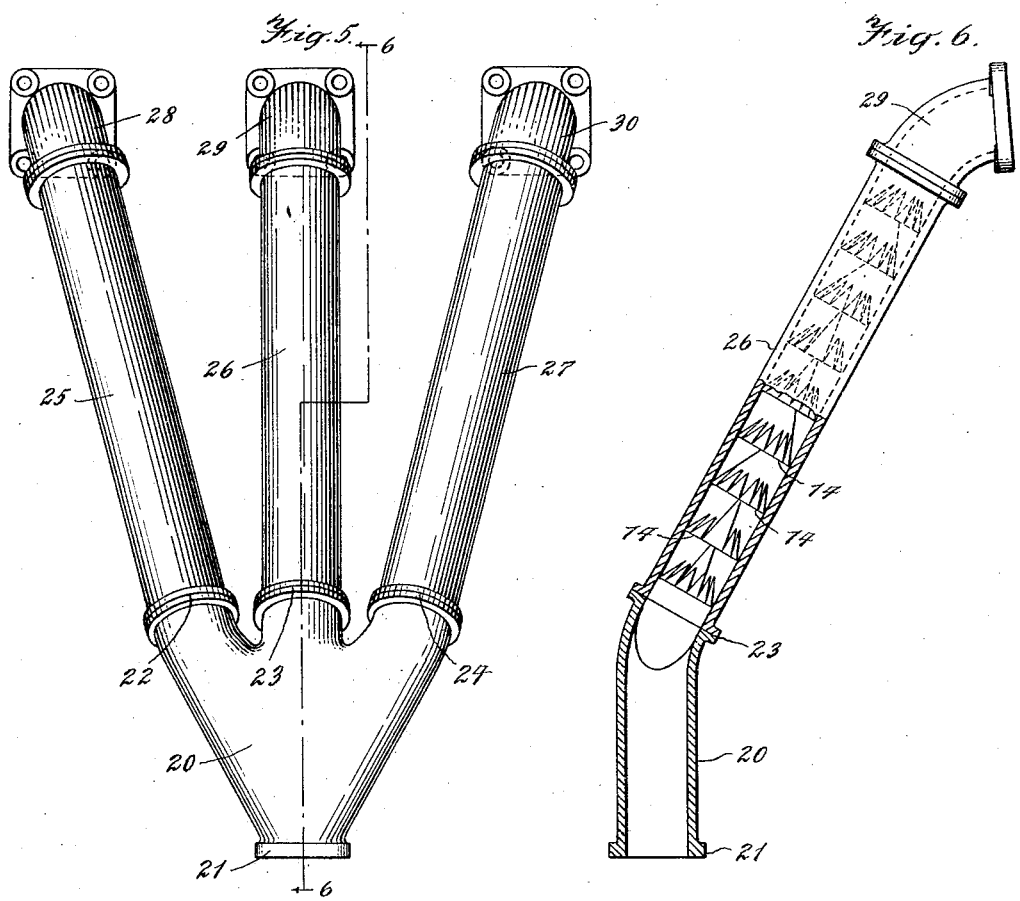
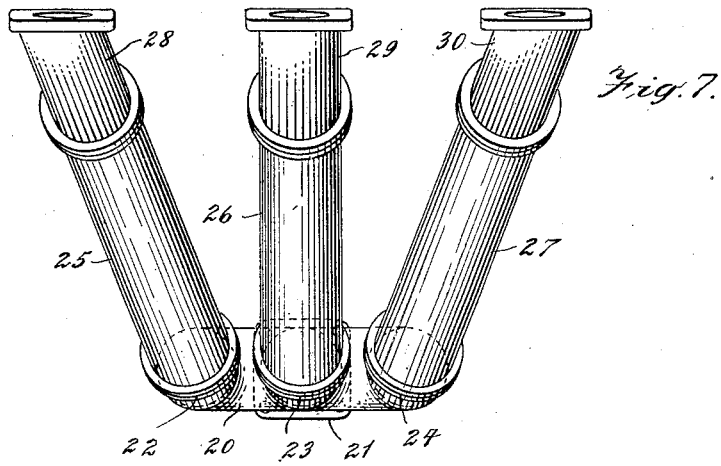
INVENTOR
John William Smith
BY
ATTORNEY Patented Nov. 1, 1932

1,885,559

UNITED STATES PATENT OFFICE

JOHN WILLIAM SMITH, OF SYRACUSE, NEW YORK

FUEL MIXING DEVICE FOR INTERNAL COMBUSTION ENGINES

Application filed May 16, 1929. Serial No. 363,633.

This invention relates to a manifold in general and more especially for an internal combustion engine.

Among the objects of the present invention it is aimed to provide an improved manifold for an internal combustion engine which is equipped with mixing devices so arranged that an equal mixing efficiency will take place in each branch of the manifold.

It is still another object of the present invention to provide an improved manifold equipped with mixing devices which will cooperate with the manifold and the action of the engine not only to effect a substantially equally efficient mixing action in each branch of the manifold but will so control the fuel stream in the branches of the manifold that they will not be freely rushing back and forth from one branch to the other during the successive intake periods of the several cylinders connected to the several branches of the manifold respectively.

These and other features, capabilities and advantages of the invention will appear from the subjoined detail description of specific embodiments of the invention illustrated in the accompanying drawings in which Figure 1 is a side elevation of one embodiment of the present invention;

Fig. 2 is an end elevation of the embodiment illustrated in Fig. 1;

Fig. 3 is a bottom plan view of the embodiment illustrated in Fig. 1;

Fig. 4 is a perspective of a mixing unit forming a part of the present invention;

Fig. 5 is a side elevation of a manifold made according to another embodiment of the present invention;

Fig. 6 is a section along the line 6—6 of Fig. 5; and

Fig. 7 is a top plan view of the embodiment illustrated in Fig. 4.

In the embodiment illustrated in Figs. 1, 2 and 3, there is provided a manifold having a main conduit portion 1 which may be connected at 2 to a suitable carburetor or the like and at 3 to the manifold arm 4 having three branchways 5, 6, and 7, which branchways are connected to the conduits 8, 9 and 10 respectively, which conduits 8, 9 and 10 respectively are connected at the ends 11, 12 and 13 respectively to three cylinders in the usual way. In the present embodiment, the conduits 1, 8, 9 and 10 are provided with mixing devices.

The mixing devices consist of a plurality of mixing units 14, such as illustrated in Fig. 4, which consist essentially of an annular row of interceptor blades. In the unit 14, illustrated in Fig. 4, there are provided a plurality of triangular interceptor blades 15 and 16. The several interceptor blades have their bases adjacent to one another in an annular row, and when the unit is disposed in a conduit such as the conduit 1, the bases are disposed adjacent to the inner periphery of the conduit 1, and the apices of the blades extend inwardly and incline in the direction of the path of movement of the passage of the stream of fuel being mixed.

The blades 15, of which a large number are provided for each unit 14, are much shorter than the blade 16 of which but one is provided for each unit. The blades 15 are inclined in the direction of the passage of the stream and the apices 17 thereof, as clearly illustrated in Figs. 3 and 4, form a circular passage between them to constitute a central passage through the conduits 1, 8, 9 and 10. The blade 16 is much longer than the blades 15 and its apex 18 extends not only across the central zone 19 between the apices 17, but also up into the next succeeding unit 14, see for instance Fig. 1 where the lower unit designated generally as $14^a$ has the apex $18^a$ of its blade $16^a$ extending into the next succeeding unit $14^b$, a short distance beyond the lower periphery 20 of the unit $14^b$.

As clearly illustrated in Fig. 1, with special reference to the conduit 1, the several units 14 disposed therein, as for instance the units $14^a$, $14^b$, $14^c$, $14^d$ and $14^e$, have their long blades $18^a$, $18^b$, $18^c$, $18^d$ and $18^e$ respectively extending at different angles to one another, the blade $18^b$ extending to the left as distinguished from the blade $18^a$ which extends to the right, the blade $18^c$ extending rearwardly as distinguished from the blade $18^d$ which extends forwardly, and the blade $18^e$ of the next succeeding unit 14ᵉ again extending to the right.

From the foregoing it will be seen that as a stream of mixture is urged along the conduit 1, the unit 14 of the series of units 14ᵃ to 14ᵉ inclusive in the conduit 1, initially acts on the stream, the blades 15 and 16 cooperating to divide the outer zone of the moving stream to be divided into a plurality of streams and to cause portions of the stream to be deflected inwardly to form an accelerated inner zone of moving material. The edges of the blade perform a shearing action as described more in detail in several of my copending applications since issued as Patents Nos. 1,720,244 and 1,720,245, and further serve to cooperate with the succeeding units 14ᵇ, 14ᶜ and so on to create periods of compression and rarefaction in the forwardly moving column of mixture so essential to destroy the stability of the gasoline or other fuel particles to facilitate the breaking up of the same when they strike a mixing unit 14. Furthermore, the blades 15 and 16 of each unit also serve to create a plurality of laterally moving spiral wave motions in the forward moving stream of mixture which similarly cooperate to destroy the stability of the gasoline globules or other fuel globules to facilitate their separation into smaller particles upon impact with a unit 14. The spiral direction imparted to the stream results from its contact with the inner circular periphery of the conduits, amplified by its contact with the successive elongated blades 16 located at different positions relative to the periphery of the conduit. The lateral wave motion imparted to the stream results from the pressure imparted to the stream adjacent to the impact faces of the blades 15 and 16 as the stream strikes the blades 15 and 16 and the rarefaction area imparted to the stream beyond the blades 15 and 16 as the stream leaves the blades 15 and 16. The blades 16 extending across the central zone of the stream of mixture passing through the conduit 1 as an instance, cause this central zone similarly to be deflected and thus insure the engagement or interference of every particle of the moving stream with a portion of the impact members or mixing devices 14 at some time or other to facilitate the separation or division of the gasoline or fuel particles into smaller particles. Furthermore, the disposition of the several blades 18ᵃ, 18ᵇ, 18ᶜ, 18ᵈ and 18ᵉ relative to one another, extending in different directions as they do, will facilitate the lateral wave motion of the stream above described. When the stream is so treated by these mixing units 14, the fuel particles will be divided into a veritable mist suspended in the air passing through with it.

By disposing a series of units 14 in the conduits 8, 9 and 10 in the embodiment of Figs. 1, 2 and 3, it will be seen that during the intake period of one cylinder, when the other cylinders are shut off, the suction created by the cylinder having such intake period will not be enabled freely to move toward it the volume of gas which may be disposed in the remaining conduit elements. As an instance, if the conduit 8 were connected with the cylinder having such intake period, the blades in the conduits 9 and 10, which are connected to cylinders which at that time are shut off, will interfere with the free movement of the volume of mixture disposed in such conduit portions 9 and 10 backward and, consequently, when, during the next step in the cycle the conduit 9 is connected to a cylinder having its intake period and the cylinders connected to the conduits 8 and 10 are shut off, there will be a considerable portion of fuel mixture in the conduit 9 ready to be drawn into the cylinder connected to it.

By this means it is apparent that the suction action, seeking the path of least resistance, will exercise a greater drawing action on the conduit 1 for each succeeding cylinder and thus minimize the waste of energy otherwise occasioned by moving the streams in the conduits 8, 9 and 10 backward and forward.

In the embodiment illustrated in Figs. 5, 6 and 7 respectively, there is provided a manifold section 20 which is connected at 21 to a carburetor or the like and is connected at the ends 22, 23 and 24 with the straight line mixing conduits 25, 26 and 27 which are connected at their other ends with the elbows 28, 29 and 30 which are connected to the separate cylinders of an engine in the usual way.

In this embodiment, the conduits 25, 26 and 27 alone are provided with the mixing units 14 similarly arranged to the arrangement of the units 14 in the conduits 8, 9 and 10 as illustrated in Fig. 3.

This embodiment has the particular advantage that the path of movement of the several streams of mixture through the conduits 25, 26 and 27 will be substantially equal to one another and thus militate to cause the several streams of mixture to be substantially equal to one another in intensity and in quantity. In this embodiment, the mixing units also serve not only to cause the fuel properly and intimately to be comminuted and mixed, but also to conserve the energy which would otherwise be lost when the streams are permitted freely to pass back and forth in the several conduits 25, 26 and 27 during the successive intake actions.

The manifold 20, illustrated in Figs. 5, 6 and 7, is preferably such that the distances between the intake 21 and the outlets 22, 23 and 24 are equal to one another. As a result thereof, the distance of flow of a mixture as it is being sucked into each cylinder is substantially equal to the distance of flow of the fuel mixture for every other cylinder connected to the manifold 20.

It is obvious that various changes and modification may be made to the details of construction without departing from the general spirit of the invention as set forth in the appended claim.

I claim:

A mixing unit for a mixing conduit in an internal combustion engine, said mixing unit comprising a plurality of short blades and an elongated blade, each of the blades being triangular in form and adapted to be arranged in position inclining in the direction of the intake flow of the mixture through said conduit, the apices of the short blades terminating in a circle concentric with the periphery of the mixing unit, and the apex of the elongated blade terminating beyond the apices of the short blades and extending across the central opening formed between the apices of the short blades whereby when said mixing unit is in place within a mixing conduit, said elongated blade will cooperate with the walls of said conduit and with the elongated blades of similar mixing units therein extending in different directions to impart a spiral wave motion to the fuel mixture as it passes through said mixing conduit.

JOHN WILLIAM SMITH.